United States Patent Office 3,598,606
Patented Aug. 10, 1971

3,598,606
PREPARATION OF FISH PROTEIN CONCENTRATE AND FISH MEAL
John Spinelli, Seattle, Wash., assignor to the United States of America as represented by the Secretary of the Interior
No Drawing. Filed Feb. 13, 1969, Ser. No. 799,117
Int. Cl. A23k 1/10
U.S. Cl. 99—7                                  13 Claims

ABSTRACT OF THE DISCLOSURE

Raw, ground, whole or deboned, fish is contacted with an acidic aqueous solution of a condensed inorganic phosphate, e.g., sodium hexametaphosphate, to insolubilize the protein fractions of the tissue components. The insolubilized protein may then be water washed to remove oil and other undesired tissue components. Either fish meal, suitable for animal feed, fertilizer, etc., or high protein concentrate, suitable for human food use, is recovered.

---

This invention relates to the production of fish protein concentrate or fish meal in order to further enable utilization of the vast supplies of fish in the oceans. Fish meal is conventionally prepared by cooking raw fish and then pressing the cooked mass to remove water and oil. The pressed liquors are then centrifuged to remove oil and the remaining liquor containing suspended, colloidal oil-dissolved proteins (stick-water) is usually concentrated to approximately 50 percent solids and marketed as "fish solubles."

Several processes have previously been employed for preparation of fish protein concentrate, most of which use solvents for extraction of nonproteinaceous matter from the fish in order to form a high protein concentrate for use in foods. However, these prior art processes have generally suffered from disadvantages such as low yield, use of large amounts of solvents, difficult removal of oil from the solvent, etc.

Other prior art processes employ reagents such as acids (U.S. Pat. 3,252,962) to insolubilize or precipitate the protein fractions of the fish, followed by solvent extraction to remove oils, water, etc., from the protein fraction. These processes have, however, typically been characterized by the use of high solvent volumes and costly recovery processes, difficult oil recovery due to solvent contamination, inability to produce separate protein fractions and the inability to retain some of the native characteristics of the protein.

It has now been found, according to the present invention, that the disadvantages of the prior art processes can be largely overcome and a high protein concentrate or fish meal readily produced by insolubilization of the protein fraction of the tissue components with a condensed phosphate. The process of the invention is particularly advantageous in that it is applicable to under-utilized fish stocks such as hake, herring, anchovy, jack mackerel, saury and dogfish shark.

In the practice of the invention the raw whole fish is initially comminuted in a conventional food-type grinding machine equipped with a plate with ⅛″ to ¼″ holes. If the fish is in a frozen state, it will generally be broken into chunks in a food-type chopping machine prior to grinding. The comminuted fish is then mixed with an acidic aqueous solution of the condensed phosphate. The resulting insolubilized protein fractions of the tissue components are then separated from the mixture by centrifugation, filtration, screening or other conventional liquids-solids separation techniques. The thus separated protein fraction may then be used directly for preparation of fish meal, requiring only drying by conventional means. Or, the protein fraction may be washed with water to remove desired amounts of residual oil, depending on the desired purity of the product.

Preparation of fish protein concentrate, suitable for human consumption, will normally require a higher degree of purification of the protein fraction than is necessary for preparation of fish meal. Again, after separation of the protein fraction, oil and other tissue components may be washed from the protein mass with water. Any residual oils remaining in the protein mass may then be stabilized with conventional artificial or natural antioxidants, or the residual oil may be removed with a solvent such as isopropyl or ethyl alcohol.

Separate protein fractions may be produced by mixing comminuted fish with water (dilute salt water may be used), separating the soluble and insoluble proteins by conventional means such as centrifuging and then quantitatively recovering the soluble proteins by treatment with the acidic solution of condensed phosphate according to the process of the invention invention.

The preferred phosphate is sodium hexametaphosphate; however, other salts of hexametaphosphoric acid may be used, such as potassium hexametaphosphate. In addition, salts of other condensed phosphoric acids may be used. Examples are metaphosphates, trimetaphosphates and tetrametaphosphates. The phosphate is believed to function in the process of the invention by forming an insoluble complex with the protein fraction of the fish. In any event, use of the phosphate results in insolubilization of the protein in such a manner as to permit subsequent removal of a large proportion of impurities, such as oils, by water-washing. The process of the invention thereby to a large extent enables elimination of costly solvent extraction processes.

For efficient insolubilization of the protein components of the fish, the pH of the water-condensed phosphate-comminuted fish slurry should be in the range of about 3.0 to 4.5 preferably about 3.8 to 4.0. This pH may be achieved by addition of acid to the water before or after addition of either the condensed phosphate or the comminuted fish. Suitable acids include sulfuric, hydrochloric, phosphoric and citric.

It has also been found that an improved yield of protein fraction may be obtained by initial acidification of the aqueous slurry of the fish prior to treatment with the phosphate. Acidification to a pH of abou 4 to 5, preferably about 4.5, is effected with any of the above acids. The mixture is then allowed to stand for a period of about 10 to 60 minutes, preferably about 15 minutes, at a temperature of about 20 to 100° C., preferably about 80° C.

Optimum amounts of condensed phosphate and water will vary widely depending on such variables as the type of fish, particle size of the comminuted fish, the particular condensed phosphate employed, the specific types of subsequent purification steps, desired purity of product, etc. Suitable amounts of phosphate will, however, generally range from about 0.5 to 2.0, preferably 1.0 to 1.5, percent by weight based on the wet weight of the fish. Proportions of water will usually range from about 3 to 1, preferably 1 to 1, parts of water to wet fish.

The temperature employed for contacting the comminuted fish with the condensed phosphate solution may range from about 20 to 100° C.; however, room temperature is usually sufficient if the fish is adequately ground and the contact time is sufficient. Optimum contact time will vary considerably, again depending on the above variables; however, a time of from about 10 to 30 minutes is usually sufficient to ensure reaction of the phosphate with the protein fractions of the tissue components. The reaction is also usually facilitated by ensuring thorough mixing of the fish and the phosphate solution, as by stirring or otherwise agitating the mixture.

Following separation of the insolubilized protein fractions from the aqueous mixture, as by centrifugation, filtration, etc., oils and other nonprotein tissue components may, if desired, be removed from the protein fractions by washing with water. The washing is readily accomplished by suspension of the insolubilized protein fractions in an amount of water sufficient to provide a water-to-wet fish ratio of about 2 to 1, preferably about 1 to 1. Use of an elevated temperature during at least one washing step usually results in more efficient removal of oils. Temperatures of from about 40 to 100° C., preferably about 80° C., are usually satisfactory. The desired temperature may be achieved by raising the temperature of the water before addition of protein or by raising the temperature of the protein-water mixture. The time period of the washing step is only that which is necessary to ensure thorough contact of the protein and the water; usually about 5 to 15 minutes is sufficient. Means of agitating the mixture, such as stirring or shaking, may also be employed to facilitate the washing. The protein is then separated from the wash water by conventional means such as centifugation or filtration.

At least a second washing may be desirable and this washing may be conducted at room temperature. Additional washings, either at elevated temperature or at room temperature, may be desirable where certain types of fish are treated or a product of higher purity is desired without further treatment. The wash water may also contain additives such as dilute alkali salts, e.g., $NaHCO_3$, $Na_2CO_3$, $Ca(OH)_2$ or $CaCO_3$. It may also contain surface active agents such as ionic or non-ionic detergents or esters of polyhydric alcohols to facilitate oil removal.

Any residual oils remaining in the protein mass after the water washing may then be stabilized with artificial or natural antioxidants. These antioxidants are conventional and are disclosed in the above-mentioned Pat. No. 3,252,962. Alternatively, the residual oil may be removed by solvent extraction with solvents such as isopropyl or ethyl alcohol. These solvents are also conventional and are disclosed in Pat. No. 3,252,962.

An additional advantage of the process of the invention is that separate protein fractions may be readily obtained. This is accomplished by means of an initial contacting of the comminuted fish with water or a saline solution in order to dissolve the soluble proteins. The preferred saline solution is a solution of sodium chloride in a concentration of about 0.1 to 0.5 molar, preferably about 0.1 molar. Solutions of other salts such as potassium chloride may also be used where particular protein fractions are desired. In addition, adjustment of pH or temperature of the solution may also be desirable for separation of specific protein fractions. Optimum amounts of salt solution employed in separation of the protein fractions may vary widely depending on the type of fish and the protein fractions to be separated. Generally, where a sodium chloride solution is used, a ratio of about 4 to 1 parts aqueous sodium chloride to 1 part fish is satisfactory, with a ratio of about 2 parts aqueous sodium chloride to 1 part fish being preferred. The soluble proteins and most of the oil are then separated from the insoluble proteins by conventional means such as centrifugation or filtration. The soluble protein fraction may be treated a second time with the salt solution or water to obtain a more complete recovery of the soluble protein. Separation of a major portion of the oil is then desirably accomplished by centrifugation of the soluble protein fraction. The soluble proteins are then recovered by insolubilization with condensed phosphate according to the process of the invention.

Mechanical deboning and removal of skin of the fish prior to treatment according to the process of the invention may also be desirable. This results in a significant reduction of the ash content accompanied by a significant reduction in fluoride and an increase in protein content.

The following examples will serve to more particularly illustrate the invention.

EXAMPLE 1

A mixture of comminuted fish is mixed with equal proportions of water containing 1.5% sodium hexametaphosphate. The pH of the slurry is lowered to 3.8–4.0 by the slow addition of approximately 1 normal sulfuric acid. The acidified mixture is centrifuged and then resuspended in water (1:1 water-to-fish ratio based on original weight of fish), and the temperature raised to 80° C. Centrifugation and resuspension in cold water are repeated. After final centrifugation, the oil content is reduced by 90–95%. Residual oil is then removed by two resuspensions in azeotropic isopropanol alcohol heated to 70° C. A ratio of 1 part alcohol to 1 part fish (based on original weight of fish) lowers the oil content (dry basis) to about 0.5%. A ratio of 2 parts alcohol to 1 part fish reduces residual oils to less than 0.2%. A 14% yield of product was obtained using the above process with Pacific herring. The proximate composition of the resulting fish protein concentrate (FPC) was as follows:

| | Percent |
|---|---|
| Protein | 86.0 |
| Ash | 10.5 |
| Oil | 0.2 |
| Volatiles | 3.0 |

EXAMPLE 2

A mixture of comminuted fish is mixed with equal portions of water. The pH of the slurry is lowered to 4.5 with 1 N sulfuric acid and heated to 80° C. After cooling to 40° C., sodium hexametaphosphate (in aqueous solution) is added to yield a concentration of 1.5% based on the wet weight of the fish. The slurry is mixed for about 5 minutes and the pH of the slurry is lowered to 3.8 with 1 N sulfuric acid. The mixture is centrifuged and then resuspended in water containing 0.25 molar sodium bicarbonate (1:1 water-to-fish ratio) and recentifuged. Residual oil is removed as described in Example 1.

EXAMPLE 3

Comminuted fish is slowly mixed in 0.1 molar sodium chloride (1 part fish to 2 parts aqueous sodium chloride). The mixture is centrifuged to remove the soluble protein and oil. The insoluble protein fraction is once again washed with 0.1 M salt, and the washings added to the first soluble-oil protein. Oil is centrifuged from the soluble protein fraction and the proteins from this fraction are recovered as phosphate complexes by the addition of sodium hexametaphosphate and dilute sulfuric acid. Both protein fractions are washed with hot (70° C.) azeotropic isopropyl alcohol to free them of residual oil.

EXAMPLE 4

Fish is deboned mechanically and the comminuted mass is mixed for one-half hour in 0.1 M salt (1 part fish to 2 parts aqueous sodium chloride). The mixture is centrifuged to remove the soluble proteins and oil. The process is then carried out as described in Example 3. The proximate composition of the protein fractions prepared are as follows:

Soluble protein complex

| | Percent |
|---|---|
| Protein | 95.9 |
| Ash | 3.5 |
| Volatiles | 1.0 |
| Oil | <0.2 |

Insoluble (myofibrillar) protein

| | Percent |
|---|---|
| Protein | 93.0 |
| Ash | 3.0 |
| Volatlies | 2.5 |
| Oil | <0.2 |

The removal of skin and bone significantly reduces the total fluoride content of FPC with Pacific herring. Whole FPC had a fluoride content of 132 p.p.m. After deboning, the fluoride content of FPC produced as described in Example 4 had a fluoride content of 43.0 p.p.m. or significantly below the tolerance level of 100 p.p.m. specified by the Food and Drug Administration.

EXAMPLE 5

Herring is ground by passing it through a suitable chopper or grinder. The ground fish is slurried with an equal part of water and 1 N sulfuric acid is added to adjust the pH to 4.5. Sodium hexametaphosphate (1.5 percent based on the weight of wet fish) in aqueous solution is then added to the slurry and the pH readjusted to 3.8 to 4.0 with 1 N sulfuric acid. The mass is then centrifuged to separate the oil and water from the protein mass. The protein mass is then resuspended in an equal part of water (80° C.) and recentrifuged. The wet cake is then dried by conventional means.

A typical analysis (dry basis) of herring meal made by this example is as follows:

| | Range, percent |
|---|---|
| Oil | 2–5 |
| Protein | 83–87 |
| Ash | 10–11 |

EXAMPLE 6

Herring is ground by passing it through a suitable chopper or grinder. The ground fish is slurried with an equal part of water, and 1 N sulfuric acid is added to adjust the pH to 4.5. The slurry is cooled to approximately 40° C. and sodium hexametaphosphate (1.5 percent based on the weight of wet fish) in aqueous solution is then added to the slurry and the pH readjusted to 3.8 to 4.0 with 1 N sulfuric acid. The mass is centrifuged to separate the oil and water from the protein mass. The protein mass is then resuspended in water containing sufficient calcium carbonate or sodium carbonate to adjust the pH of 5.5. After the pH adjustment, the slurry is centrifuged and the mass dried by conventional means.

What is claimed is:

1. A process for preparation of fish protein concentrate or fish meal comprising (1) contacting raw, comminuted fish with an acidic aqueous solution of a condensed inorganic metaphosphate of a class consisting of sodium and potassium to insolubilize the protein fractions of the fish tissue components and (2) separating the insolubilized protein fractions from the aqueous solution.

2. The process of claim 1 including the additional preliminary step of treating the comminuted fish in aqueous slurry at a pH of about 4 to 5 for a time and at a temperature sufficient to partially denature the fish protein.

3. The process of claim 1 in which the pH of the phosphate solution is from about 3.5 to 4.5.

4. The process of claim 3 in which the desired pH is achieved by addition of sulfuric acid.

5. The process of claim 1 including the additional step of water-washing the separated insolubilized protein fraction to remove the major portion of oils and other undesired tissue components.

6. The process of claim 5 in which the wash solution contains dilute alkali salts or surface active agents to facilitate removal of residual oils.

7. The process of claim 5 in which at least one water washing of the separated protein fraction is carried out at an elevated temperature of from about 40 to 100° C.

8. The process of claim 5 including the additional step of stabilizing any residual oils by addition of an antioxidant.

9. The process of claim 6 including the additional step of removing any residual oils by solvent extraction.

10. The process of claim 1 including an initial step of contacting the comminuted fish with water or a saline solution in order to obtain separate soluble protein fractions.

11. The process of claim 10 in which the saline solution is a solution of sodium chloride.

12. The process of claim 1 in which a major portion of the bone and skin are mechanically removed prior to insolubilization of the protein.

13. The process of claim 1 in which the condensed inorganic metaphosphate is sodium hexametaphosphate.

References Cited

UNITED STATES PATENTS

| 2,566,549 | 9/1951 | Beckwith et al. | 99—7X |
| 2,667,416 | 1/1954 | McFee | 99—7 |
| 2,934,433 | 4/1960 | Brocklesby et al. | 99—7 |
| 3,062,655 | 11/1962 | Staackmann et al. | 99—18X |
| 3,099,562 | 7/1963 | Rogers | 99—18 |
| 3,252,962 | 5/1966 | Whaley et al. | 99—18X |

NORMAN YUDKOFF, Primary Examiner

K. P. VAN WYCK, Assistant Examiner

U.S. Cl. X.R.

99—18